(12) United States Patent
Walter

(10) Patent No.: US 7,415,965 B2
(45) Date of Patent: Aug. 26, 2008

(54) FUEL INJECTION METHOD FOR INTERNAL-COMBUSTION ENGINE, NOTABLY OF DIRECT INJECTION TYPE, COMPRISING A PISTON PROVIDED WITH A BOWL AND A TEAT

(75) Inventor: Bruno Walter, Colombes (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 0 days.

(21) Appl. No.: 11/610,672

(22) Filed: Dec. 14, 2006

(65) Prior Publication Data

US 2007/0163535 A1    Jul. 19, 2007

(30) Foreign Application Priority Data

Dec. 21, 2005  (FR) .................................. 05 13069

(51) Int. Cl.
*F02B 17/00*  (2006.01)
*F02B 15/00*  (2006.01)
(52) U.S. Cl. ........................ 123/305; 123/299
(58) Field of Classification Search ................ 123/299, 123/276, 300, 301, 305, 430, 295; 701/104
See application file for complete search history.

(56) References Cited

U.S. PATENT DOCUMENTS

| | | | |
|---|---|---|---|
| 5,740,775 A * | 4/1998 | Suzuki et al. ................ | 123/299 |
| 6,202,601 B1 | 3/2001 | Ouellette et al. | |
| 6,637,403 B2 | 10/2003 | Walter | |
| 6,640,772 B2 | 11/2003 | Gatellier et al. | |
| 6,877,464 B2 * | 4/2005 | Hitomi et al. .............. | 123/58.8 |
| 7,284,506 B1 * | 10/2007 | Sun et al. .................... | 123/1 A |
| 2003/0168037 A1 * | 9/2003 | zur Loye et al. ............. | 123/295 |
| 2004/0118116 A1 * | 6/2004 | Beck et al. .................... | 60/601 |
| 2004/0129245 A1 * | 7/2004 | Hitomi et al. ................ | 123/299 |
| 2004/0149255 A1 * | 8/2004 | zur Loye et al. ............ | 123/295 |
| 2005/0211218 A1 * | 9/2005 | Liu et al. ..................... | 123/299 |
| 2005/0224606 A1 * | 10/2005 | Dingle ..................... | 239/533.2 |
| 2005/0288846 A1 * | 12/2005 | Liu et al. ..................... | 701/104 |
| 2006/0196467 A1 * | 9/2006 | Kang et al. ................. | 123/305 |

FOREIGN PATENT DOCUMENTS

| | | |
|---|---|---|
| DE | 10028449 | 7/2001 |
| EP | 0887525 A2 | 12/1998 |
| EP | 0943793 A2 | 9/1999 |
| EP | 1357274 | 10/2003 |
| EP | 1445461 A2 | 8/2004 |

(Continued)

*Primary Examiner*—Mahmoud Gimie
(74) *Attorney, Agent, or Firm*—Antonelli, Terry, Stout & Kraus, LLP.

(57) ABSTRACT

The present invention relates to a method of injecting fuel into the combustion chamber (16) of a cylinder of a direct-injection four-stroke internal-combustion engine, notably of diesel type, that can run according to a homogeneous combustion mode and according to a conventional combustion mode.

According to the invention, this method consists, for the conventional combustion mode of the engine, in feeding into this chamber a first amount of fuel in the vicinity of the top dead centre of the piston at the beginning of the intake phase and another quantity of fuel in the vicinity of the top dead centre of this piston at the end of the compression phase.

14 Claims, 1 Drawing Sheet

FOREIGN PATENT DOCUMENTS

| | | |
|---|---|---|
| FR | 2 818 324 | 6/2002 |
| FR | 2 818 325 | 6/2002 |
| FR | 2 827 913 | 1/2003 |
| WO | WO 2005/001255 | 1/2005 |
| WO | WO 2005/033493 A1 | 4/2005 |
| WO | WO 2006/097639 | 9/2006 |

* cited by examiner

FUEL INJECTION METHOD FOR INTERNAL-COMBUSTION ENGINE, NOTABLY OF DIRECT INJECTION TYPE, COMPRISING A PISTON PROVIDED WITH A BOWL AND A TEAT

FIELD OF THE INVENTION

The present invention relates to a fuel injection method for an internal-combustion engine, notably of direct injection type, in particular a diesel engine, with a piston provided with a bowl comprising a teat.

It more particularly relates to a four-stroke diesel type direct-injection engine that can run according to two combustion modes. A mode referred to as homogeneous, better known as "Homogeneous Charge Compression Ignition" (H.C.C.I.), that is used for low and medium engine loads, with at least one fuel injection during compression. This or these injections allow to obtain homogeneous mixing of the fuel with air or with a mixture of air and of recirculated exhaust gas, before combustion starts by self-ignition. The other combustion mode, referred to as conventional combustion mode, consists of a fuel injection in the vicinity of the compression top dead centre and of a diffusion combustion, this mode being preferably used at high loads.

BACKGROUND OF THE INVENTION

Such an engine type, as better described in French patent applications Nos. 2,818,324; 2,818,325 and 2,827,913 filed by the applicant, comprises at least one cylinder, a piston sliding in this cylinder, a combustion chamber delimited on one side by the upper face of the piston comprising a teat arranged in the centre of a concave bowl and at least one injection nozzle for injecting fuel with a nappe angle less than or equal to $$2 Arctg \frac{CD}{2F},$$

where CD is the diameter of the cylinder and F the distance between the point of origin of the fuel jets from the injection nozzle and the position of the piston corresponding to a crank angle of 50° to the top dead centre.

The fuel does thus not come into contact with the cylinder wall and it can mix with the air or the mixture of air and of recirculated exhaust gas present in the combustion chamber.

This layout, although satisfactory, involves some significant drawbacks.

Thus, in conventional combustion mode, the fuel is injected when the piston is in the vicinity of the top dead centre of the compression phase. In this situation and considering the small jet nappe angle, this fuel, in vapour-liquid two-phase form, slides along the wall of the teat, flows to the bottom of the bowl, is guided by the lateral wall of this bowl and reaches the combustion chamber. More particularly, this fuel is sent, on the one hand, to the squish zone above the piston and, on the other hand, to the centre of this bowl.

Considering the path followed by the fuel, the latter cannot easily mix with the air present in the bowl and the maximum fuel/air ratio reached for operation of the engine can remain low in relation to conventional engines using injection nozzles with a large fuel jet nappe angle, generally of the order of 140°. This results in a bad use of the air contained in the combustion chamber, notably in the squish zone.

Furthermore, the teat undergoes a high thermal stress due to the energy released during combustion and high-temperature zones are located thereon, more particularly near to the top thereof.

The present invention aims to overcome the aforementioned drawbacks by means of a fuel injection method in two stages allowing to provide suitable mixing of the fuel with the air contained in the bowl.

SUMMARY OF THE INVENTION

The present invention therefore relates to a method of injecting fuel into the combustion chamber of the cylinder of a direct-injection four-stroke internal-combustion engine, notably of diesel type, that can run according to a homogeneous combustion mode and according to a conventional combustion mode, characterized in that it consists, for the conventional combustion mode of the engine, in feeding into this chamber a first amount of fuel in the vicinity of the top dead centre of the piston at the beginning of the intake phase and another amount of fuel in the vicinity of the top dead centre of this piston at the end of the compression phase.

Advantageously, this method can consist in introducing the first amount of fuel in at least one injection.

Preferably, the method can consist in introducing the first amount of fuel for positions of the corresponding piston of 0° to 50° crank angle.

This method can consist in introducing, for the first amount of fuel, between 2% and 10% of the total amount of fuel provided for the intake and compression phases.

BRIEF DESCRIPTION OF THE FIGURES

Other features and advantages of the invention will be clear from reading the description hereafter, given by way of non limitative example, with reference to the accompanying figures wherein.

DETAILED DESCRIPTION

Figure 1:
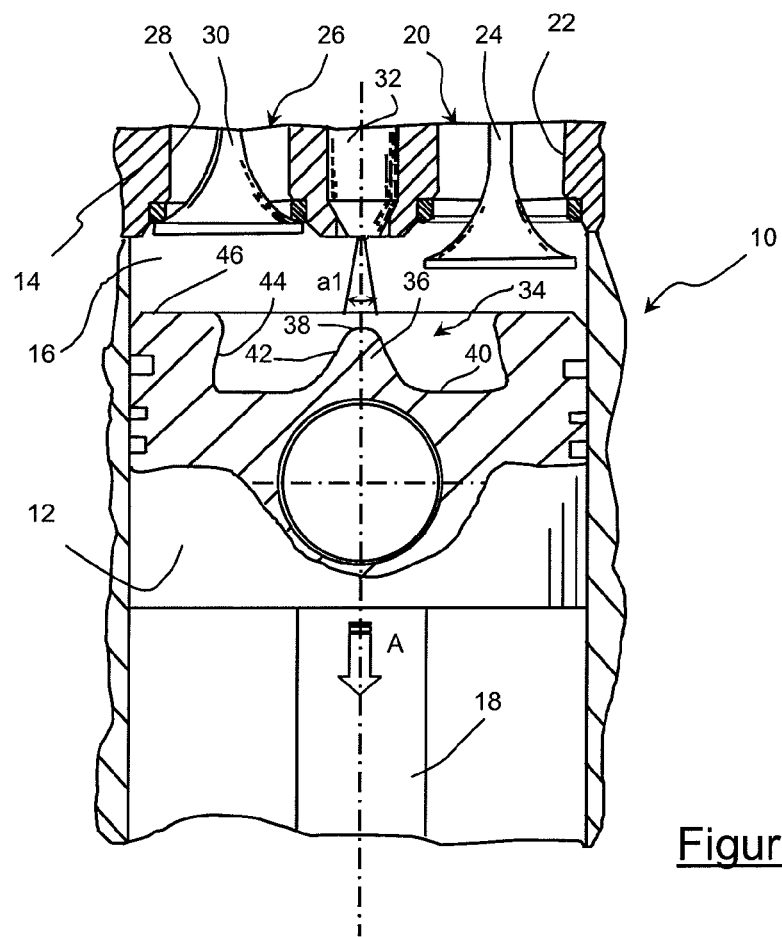
FIG. 1 shows an internal-combustion engine using the method according to the invention.

The engine of FIG. 1 is a non limitative example illustrating a type of four-stroke internal-combustion engine, notably of diesel type, that can run according to two combustion modes, a homogeneous mode and a conventional mode.

This engine comprises at least one cylinder 10, a piston 12 that slides within this cylinder in a reciprocating rectilinear motion and a cylinder head 14 that shuts off the top of the cylinder. This piston delimits, with the lateral wall of the cylinder and the surface of the cylinder head opposite, a combustion chamber 16 within which combustion of a fuel mixture can take place when the conditions for such a combustion are met. This piston is connected by a rod 18 to a crankshaft (not shown) and it therefore oscillates through the action of this crankshaft between an upper position referred to as top dead centre (TDC), where the combustion chamber occupies a limited volume, and a lower position referred to as bottom dead centre (BDC), where the volume of the combustion chamber is the greatest.

In the description hereafter, what is referred to as piston position at top dead centre and bottom dead centre of course corresponds to crank angles generally ranging from 0° to 180° for the motion of the piston from the TDC to the BDC.

In FIG. 1, the cylinder head carries at least one intake means 20 with an intake pipe 22 controlled by a shutoff means such as an intake valve 21, at least one exhaust means 26 with a burned gas exhaust pipe 28, also controlled by a shutoff means such as an exhaust valve 30, and a fuel injection nozzle 32, preferably of multi-jet type, allowing the fuel to be fed into combustion chamber 16. Preferably, this nozzle is part of an injection means, with an injection ramp and a pump for example, that is controlled by any means and notably by the engine computer (not shown) such an engine is generally equipped with.

The combustion chamber is thus delimited by the inner face of cylinder head 14, the circular wall of cylinder 10 and the upper face of piston 12.

This upper face of the piston comprises a concave bowl 34 within which a teat 36 located in the centre of the bowl rises towards cylinder head 14.

The teat, generally truncated-cone-shaped, comprises a preferably rounded top 38 extended, in the direction of bottom 40 of the bowl, by a substantially rectilinear inclined flank 42 then, from this bottom, by an inclined lateral wall 44, substantially rectilinear and inclined in the direction of this teat, joining a substantially horizontal surface 46 of the upper face of the piston.

The fuel injection nozzle is of small jet nappe angle $a_1$ type and it is so selected that the wall of cylinder 10 is never made wet by the fuel for any position of piston 12 between +50° and +α or between −50° and −α where α represents the crank angle for the injection phase selected in relation to the top dead centre (TDC), this angle α being greater than 50° and less then or equal to 180°.

If CD represents the diameter (in mm) of cylinder 10 and F the distance (in mm) between the point of origin of the fuel jets and the position of the piston corresponding to a crank angle of 50°, then nappe angle $a_1$ (in degrees) is less than or equal to $$2 \text{Arctg} \frac{CD}{2F}.$$

What is referred to as nappe angle is the vertex angle formed by the cone from nozzle 32 and whose fictitious peripheral wall passes through all the axes of the fuel jets.

A typical angular range for nappe angle $a_1$ is at most 120° and preferably between 40° and 100°.

Advantageously, the vertex angle of the teat is selected in such a way that it is greater than nappe angle $a_1$ of the fuel jets by a value ranging between 0° and 60°, and the angle of inclination of lateral wall 44 of bowl 34 is at most equal to half nappe angle $a_1$.

As it is well known, such an engine runs according to four strokes (or four phases), an intake phase with a motion of the piston from the intake top dead centre (TDC) thereof to the bottom dead centre (BDC), followed by a compression phase with a motion of the piston from the BDC to the compression top dead centre (TDC), then an expansion (or combustion) phase with a piston stroke from the compression TDC to the BDC, and finally an exhaust phase during which the piston moves from the BDC to the exhaust TDC.

During operation, the engine computer receives signals from the various detectors of the engine and of the vehicle such as, notably, the rotating speed or the torque required by the driver when pressing down on the accelerator pedal. Depending on these various signals, the computer determines, from mappings contained in its memory, the mode according to which the engine must run, as well as the total amount of fuel to be injected into the combustion chamber.

Thus, in cases where the engine runs in conventional mode, the piston is in the vicinity of the intake TDC and moves towards the BDC thereof, as illustrated by arrow A in FIG. 1. In this configuration, intake valve 24 is in open position and air (supercharged or not) or a mixture of air and of recirculated exhaust gas (EGR) is fed into combustion chamber 16. The engine computer controls nozzle 32 so as to introduce a first predetermined amount of fuel during the start of this intake phase and preferably during a piston stroke corresponding to a crank angle ranging from 0° to 50°. Advantageously, introduction of this amount of fuel is subdivided into a multiplicity of successive injections of equal or different quantities, evenly or unevenly distributed during the piston stroke corresponding to the 0° to 50° crank angle travel range. Advantageously, this first amount of fuel represents 2% to 10% of the total amount of fuel injected.

As a result of this injection (or of these successive injections) and of the bowl being in the vicinity of the nozzle, not only does the fuel slide along wall 42 of teat 36, but it also sweeps the hollow volume of bowl 34, thus providing better mixing of the air present in this bowl with the fuel injected. Furthermore, this injection (or these injections) allows fuel to be sent to zones of the combustion chamber that are usually difficult to reach, notably during fuel injection at the compression TDC such as, for example, above the teat. A better use is thus made of the air contained in the chamber and the fuel/air ratio can be increased, as well as the engine power. It can be noted that the piston remains at a sufficiently high temperature to take part in the fuel evaporation, which thus minimizes the risk of fuel adhesion, in liquid form, to the bowl walls. This risk is all the more limited since the descending motion of the piston down to the BDC thereof causes detachment of this liquid fuel film from the bowl walls. Furthermore, through simultaneous fuel injection and air intake, the fuel absorbs the heat contained in this air and cooling of the air by the fuel allows filling of the combustion chamber to be increased by the intake of a larger amount of air in the same volume. Besides, the fuel introduced and/or the air thus cooled is in contact with the different surfaces of the bowl and notably with the teat, which allows to provide cooling of these surfaces and to limit the appearance of hot spots on this teat.

Figure 2:
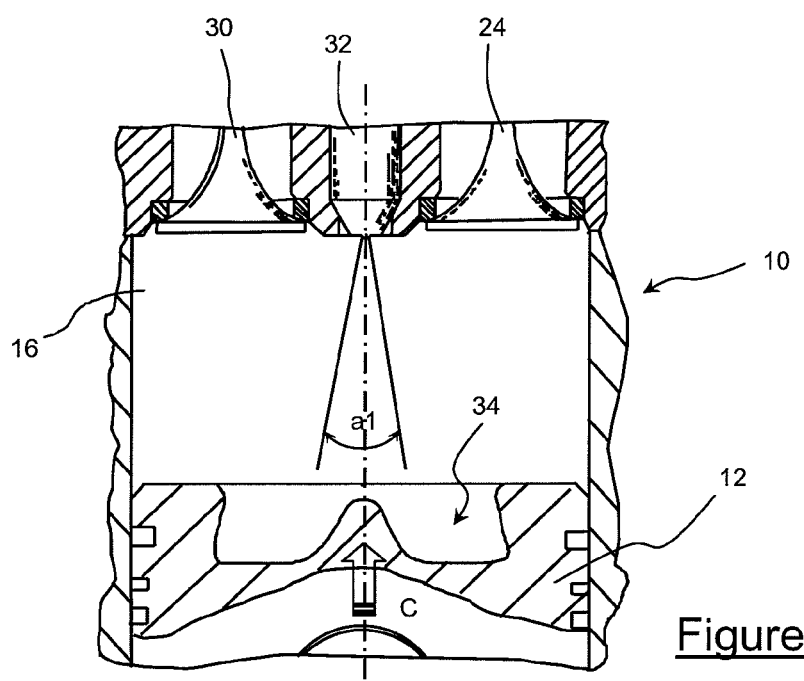
FIG. 2 shows the engine of FIG. 1 according to a second configuration during the method according to the invention.

Thus, when piston 12 reaches its BDC position, combustion chamber 12 contains a fuel mixture that is more or less homogeneous but of low fuel/air ratio because of the small amounts of fuel injected, and injection of another amount of fuel can continue as illustrated in FIG. 2.

In the position illustrated in this figure, the engine is in compression phase, the intake 24 and exhaust 30 valves are closed and piston 12 moves from the BDC to the compression TDC thereof as shown by arrow C.

Another amount of fuel is fed into the combustion chamber by nozzle 32 during the ascending stroke of the piston towards the TDC thereof. In general, for working points at full load and high engine speed (of the order of 4000 rpm), this injection is carried out when the piston reaches a position close to the TDC ranging between 20° and 40° crank angle and beyond this TDC, so that the physico-chemical properties of the fuel mixture are such that they allow self-ignition of this fuel mixture in the vicinity of the TDC and during the expansion phase that follows this compression phase. As it is known to the man skilled in the art, this position of the piston for fuel injection depends on many parameters such as the engine compression ratio, the speed and the load of this engine, the intake air pressure, the allowable maximum pressure in the cylinders, the maximum exhaust gas temperature, . . .

Preferably, the first amount of fuel fed into the combustion chamber ranges from 2% to 10% of the total amount of fuel fed into this chamber during the intake and compression phases. More preferably yet, this first amount of fuel corresponds to about 5% of this total amount.

The present invention is not limited to the embodiment example described and it encompasses any equivalent or variant.

The invention claimed is:

1. A method of injecting fuel into the combustion chamber of the cylinder of a direct-injection four-stroke internal-combustion engine, notably of diesel type, that can run according to a homogeneous combustion mode and according to a conventional combustion mode, wherein the combustion chamber of the cylinder is delimited on one side by the upper face of a piston comprising a concave bowl within which a generally teat of vertex angle ($a_2$) is arranged, comprising, for the conventional combustion mode of the engine, feeding into this chamber a first amount of fuel in the vicinity of the top dead centre of the piston at the beginning of the intake phase, wherein the first amount of fuel is fed for positions of the corresponding piston ranging from 0° to 50° crank angle, and another amount of fuel in the vicinity of the top dead centre of this piston at the end of the compression phase, wherein the fuel is fed from a fuel injection nozzle with a jet nappe angle ($a_1$) in degrees less than or equal to $$2 \text{Arctg} \frac{CD}{2F},$$

where CD is the diameter of cylinder and F the distance between the point of origin of the fuel from the injection nozzle and the position of piston corresponding to a crank angle of 50° to the top dead centre.

2. The method as claimed in claim 1 wherein, for the first amount of fuel, between 2% and 10% of the total amount of fuel provided for the intake and compression phases is fed.

3. The method as claimed in claim 1, wherein the first amount of fuel is fed in a plurality of successive injections.

4. The method as claimed in claim 1, wherein the first amount of fuel is fed in one injection.

5. The method as claimed in claim 1, wherein the another amount of fuel is fed when the corresponding piston reaches a position in the vicinity of top dead centre ranging from 0° to 50° crank angle and beyond top dead centre.

6. The method as claimed in claim 1, wherein and the vertex angle ($a_2$) of the teat is greater than jet nappe angle ($a_1$) by a value ranging between 0° and 60°.

7. The method as claimed in claim 6, wherein an angle of inclination of a lateral wall of the concave bowl is at most equal to half the nappe angle $a_1$.

8. A method of injecting fuel into the combustion chamber of the cylinder of a direct-injection four-stroke internal-combustion engine, notably of diesel type, that can run according to a homogeneous combustion mode and according to a conventional combustion mode, wherein the combustion chamber of the cylinder is delimited on one side by the upper face of a piston comprising a concave bowl within which a generally teat of vertex angle ($a_2$) is arranged, comprising, for the conventional combustion mode of the engine, feeding into this chamber a first amount of fuel in the vicinity of the top dead centre of the piston at the beginning of the intake phase and another amount of fuel in the vicinity of the top dead centre of this piston at the end of the compression phase, wherein the fuel is fed from a fuel injection nozzle with a jet nappe angle ($a_1$) in degrees less than or equal to $$2 \text{Arctg} \frac{CD}{2F},$$

where CD is the diameter of cylinder and F the distance between the point of origin of the fuel from the injection nozzle and the position of piston corresponding to a crank angle of 50° to the top dead centre.

9. The method as claimed in claim 8, wherein, for the first amount of fuel, between 2% and 10% of the total amount of fuel provided for the intake and compression phases is fed.

10. The method as claimed in claim 8, wherein and the vertex angle ($a_2$) of the teat is greater than jet nappe angle ($a_1$) by a value ranging between 0° and 60°.

11. The method as claimed in claim 10, wherein an angle of inclination of a lateral wall of the concave bowl is at most equal to half the nappe angle $a_1$.

12. The method as claimed in claim 8, wherein the another amount of fuel is fed when the corresponding piston reaches a position in the vicinity of top dead centre ranging from 0° to 50° crank angle and beyond top dead centre.

13. The method as claimed in claim 8, wherein the first amount of fuel is fed in a plurality of successive injections.

14. The method as claimed in claim 8, wherein the first amount of fuel is fed in one injection.

* * * * *